INVENTOR
Richard Jung

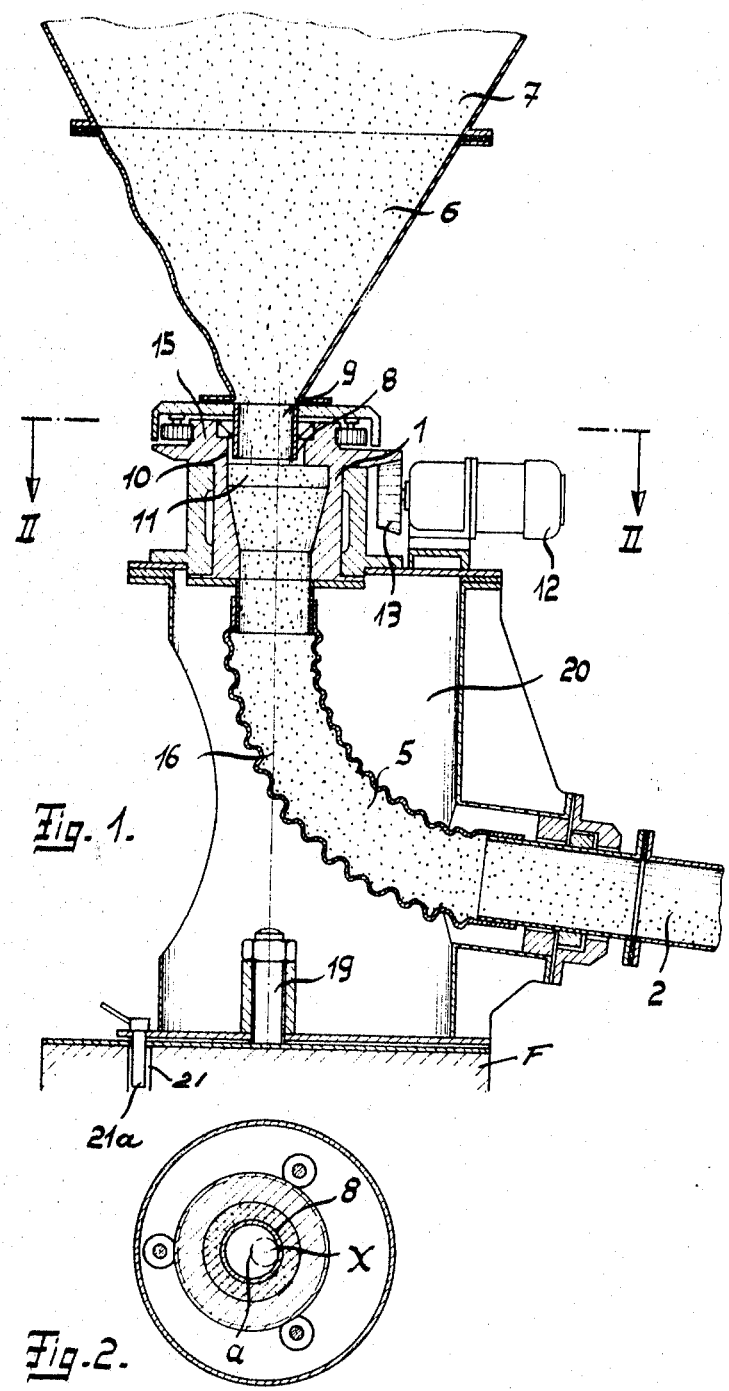

United States Patent Office 3,460,722
Patented Aug. 12, 1969

3,460,722
ROTARY TUBULAR CONVEYOR WITH FLEXIBLE HOLLOW SHAFT
Richard Jung, Gummersbach, Germany, assignor to L. & C. Steinmuller G.m.b.H., Gummersbach, Germany
Filed July 6, 1967, Ser. No. 651,485
Claims priority, application Germany, July 8, 1965, St 25,615
Int. Cl. G01f 11/20; B65g 65/35, 47/16
U.S. Cl. 222—410                    7 Claims

ABSTRACT OF THE DISCLOSURE

The present invention concerns a rotary tubular conveyor having first rotary tubular conveying means adapted to be connected to a hopper for receiving pourable goods therefrom, and also comprises second rotary tubular means arranged in spaced relationship to said first rotary tubular means, said first and second rotary tubular means being interconnected by flexible tubular body means for conveying goods from said first to said second rotary tubular means and for transferring the rotary movement from said first rotary tubular means to said second rotary tubular means.

---

The present invention relates to a rotary tubular conveyor with a flexible hollow shaft and in particular concerns a device of this type for meting out and dosing pourable goods, especially adhesive or cohesive goods, which do not flow easily.

For meting out and dosing of pourable goods, various devices have been suggested and among others also a rotary tubular conveyor according to which a horizontal or slightly inclined rotating tubular pipe conveys pourable goods without force and without any material wear. Furthermore, withdrawing devices for silos have been suggested in which the lower portion of the silo is flexible and in particular is connected to a rotary tubular member while by oscillating movements of the flexible silo outlet the formation of accumulations or a clogging up of the goods in the hopper is prevented.

It is an object of the present invention to provide a rotary tubular conveyor which will enlarge the field of employment of this type of conveyor.

It is another object of this invention to provide a rotary tubular conveyor which is simple in construction and which is easily handled.

These and other objects and advantages of the invention will appear more clearly from the following specification in connection with the accompanying drawings, in which:

FIG. 1 diagrammatically illustrates a first embodiment of a device according to the present invention.

FIG. 2 is a section taken along the line II—II of FIG. 1.

Figure 3:
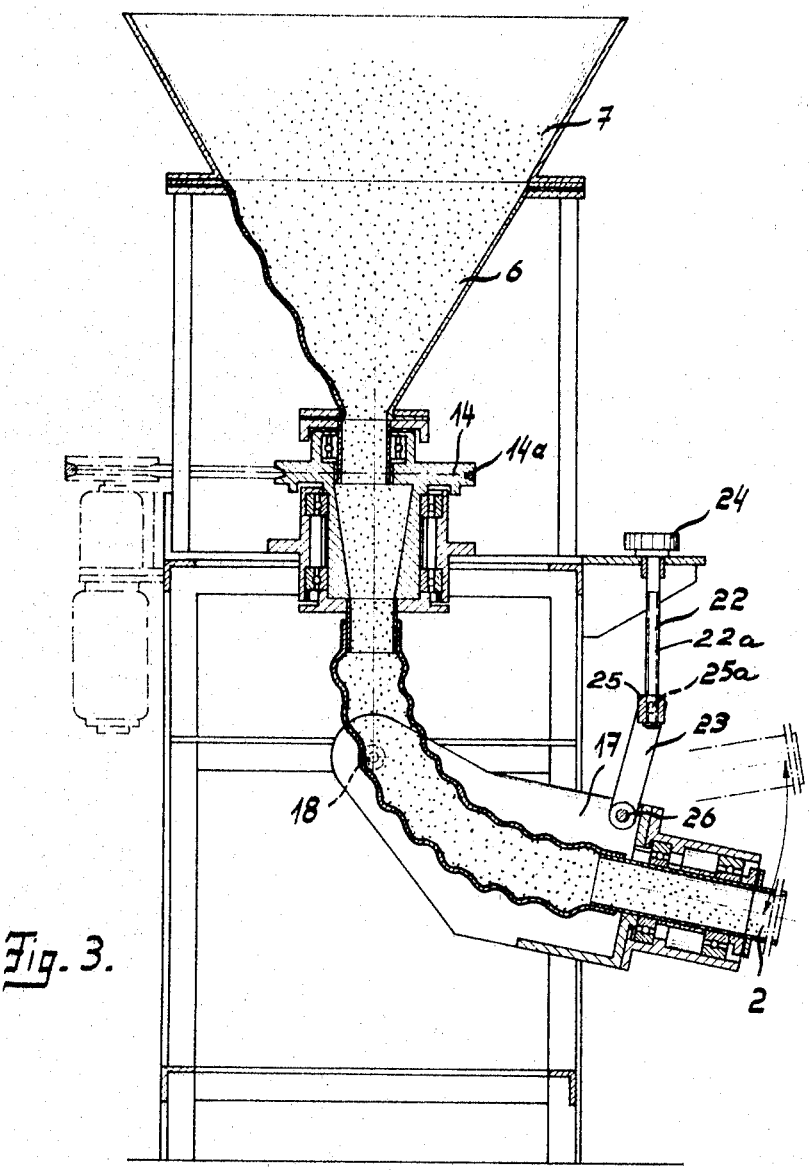
FIG. 3 represents a further possible embodiment of the device illustrated in FIG. 1.

The rotary tubular conveyor according to the present invention is characterized primarily in that between the rotary tubular conveying elements there is interposed a flexible rotatable hollow body structure which may be of rubber or synthetic material, as for instance polyvinylchloride, and may be reinforced, if so desired, for instance by wire inserts.

The employment of a hollow body structure between two rotary tubular conveying elements has the advantage that it permits any desired variation in the path of the goods to be poured.

According to a further suggestion of the present invention, the flexible hollow body structure is interposed between and directly below a vertical hopper outlet of a silo and a rotary tubular conveying element which is arranged at an angle with regard to the horizontal plane. Furthermore, between the outer surface of the hopper outlet and the inner surface of the hollow body inlet there is provided an annular gap. The vertical arrangement of the conveyor element in combination with the gap between the rotary tubular conveying element and the stationary or oscillating hopper outlet will in an advantageous manner prevent an excessive filling of the hopper outlet by the poured goods thereby making this part of the device practically wear free. Moreover, such an arrangement also permits a better sealing possibility because the goods to be conveyed will in view of their gravity not enter the annular gap.

While with this device the rotary tubular conveying element arranged directly below the hopper outlet has a vertical and rigid position, the other rotary tubular conveying element is according to a further suggestion of the present invention pivotally mounted for pivoting in a vertical plane as well as in a horizontal plane. The vertical adjustability of the rotary tubular conveying element will in an advantageous manner permit a control or interruption of the conveyed quantity of pourable goods passed through the rotary tubular conveying elements which rotate at a constant speed. It is also to be noted that the conveyed quantity of pourable goods may be controlled by varying the speed of said rotary tubular elements. The pivoting of the rotary tubular conveying element in a horizontal plane brings about the advantage that a plurality of consumer stations can be supplied by one and the same device.

Instead of the above described arrangement according to which the rotary tubular conveying elements are interconnected by hollow body means, it is also possible according to a further modification of the present invention to provide an arrangement according to which, through the intervention of flexible hollow body elements, rotary tubular conveying elements are coupled to each other in such a way that they can be pivoted at different angles with regard to the vertical plane as well as with regard to the horizontal plane. Such a device offers the same advantages as the one described above which means that the quantity to be conveyed can be controlled by the vertical tiltability and that also a plurality of consumer stations can be supplied in view of the horizontal tiltability of the rotary tubular conveying elements.

In particular instances, for example, when hollow body elements are employed which have considerable dimensions, it is advantageous to provide an additional hollow body element within a hollow body element in such a way that the outer hollow body element takes care of the transmission of the torque whereas the inner hollow body element permits the conveying of the pourable goods.

Referring now to the drawings in detail and FIG. 1 thereof in particular, the arrangement of FIG. 1 concerns a device by means of which the rotary tubular conveying elements 1 and 2 are interconnected by a flexible hollow body 5. The rotary tubular conveying element 1 is arranged vertically underneath the hopper 6. Between the outer surface 8 of the hopper outlet 9 and the inner surface 10 of the hollow shaft inlet 11 there is provided an annular gap. The rotary tubular element 1 is driven by means of a motor 12 through the intervention of a bevel gear transmission 13 according to FIG. 1 or through a pulley 14 and V-belt 14a (FIG. 3). The upper portion 15 of the rotary tubular conveying element 1 is arranged eccentrically with regard to the axis of rotation 16 so that in view of the eccentric position of the axis point X (FIG. 2) of the rotary tubular conveying element 1, the hopper outlet 9 will carry out an oscillating movement along the circular path a (FIG. 2). The embodiment shown in FIG. 1 permits the pivoting of the rotary tubular conveying element 2 only along a horizontal path.

To this end, the frame 20 supporting the rotary tubular conveying element 2, is pivotally mounted on a vertical bolt 19 supported by a platform, foundation or the like F, which is provided with one or more bores 21 adapted selectively to be engaged by locking bolts 21a supported by frame 20 and adapted selectively to be withdrawn from the bore or bores 21.

Figure 6:
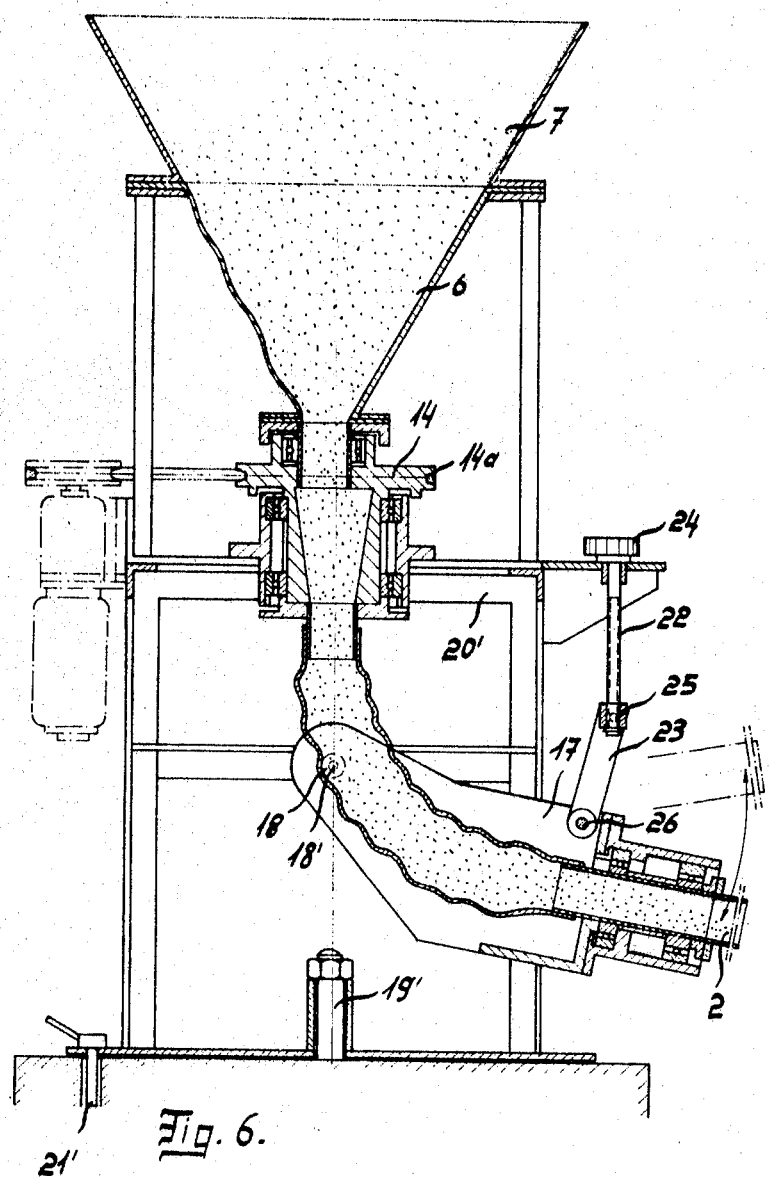
FIG. 6 shows a device similar to those of FIGS. 1 and 3 but differing therefrom in that the tubular element 2 is tiltable both in a horizontal as well as in a vertical plane.

While according to FIG. 1 the rotary tubular conveying element 2 is pivotable in a horizontal plane, i.e. about a vertical pivot, according to FIG. 3, it may be pivoted in a vertical plane, i.e. about a horizontal pivot. More specifically, according to FIG. 3, the tubular element 2 is mounted in a fork-shaped support 17, which in turn is pivotally supported by a horizontal shaft 18. The pivoting or adjustment of the fork-shaped support 17 in the vertical plane may be effected by means of a threaded spindle 22 having a knob 24 connected to one end thereof while the thread 22a of said spindle is threadedly engaged by a nut 25 pivotally connected by a bolt 25a with one end of a link 23, the other end of which is pivotally connected to support 17 by a bolt 26. The framework 20' of FIG. 6 supporting the pivots 18, 18' for the support 17 and also supporting the adjusting means 24, 22, 23, 25 is pivotable about pivot 19'.

Figure 4:
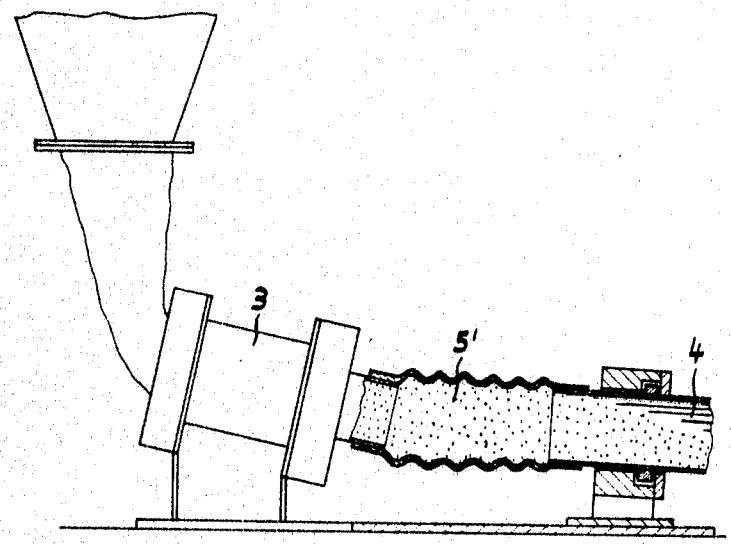
FIG. 4 is still a further modification of a device according to the present invention.
Figure 5:
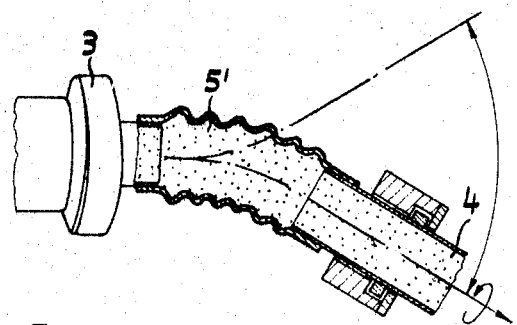
FIG. 5 represents a top view of the embodiment of FIG. 4.

With the embodiments illustrated in FIGS 1 and 3, the angular position of the rotary tubular conveying element 1 remains unchanged. However, it is also possible within the framework of the present invention so to arrange the two rotary tubular conveying elements 3, 4 that they can be pivoted in the vertical plane as well as in the horizontal plane. Such an arrangement is shown in FIGS. 4 and 5.

Figure 7:
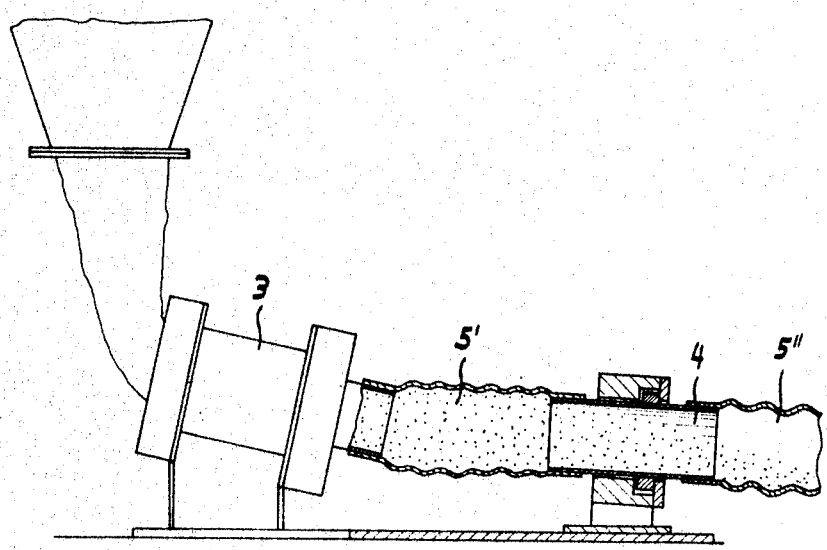
FIG. 7 shows an arrangement modified over that of FIG. 4 in that more than two tubular members are interconnected.

While in the arrangements of FIGS. 1–5 only two rotary tubular conveying elements are shown, it is, of course, to be understood that more than two rotary tubular conveying elements may be provided in a device according to the present invention. Such an arrangement is shown, for instance, in FIG. 7 according to which an additional tubular member 5″ is connected to the tubular member 4.

It is, of course, to be understood that the present invention is, by no means, limited to the particular embodiments shown in the drawings, but also comprises any modifications within the scope of the appended claims.

What I claim is:

1. A rotary tubular conveyor which includes: first tubular means rotatable about a first axis and adapted to receive pourable goods, driving means drivingly connected to said first tubular means for rotating the same, second rotatable tubular means arranged in spaced relationship to said first rotatable tubular means, intermediate flexible hollow body means interconnecting said first and second rotatable tubular means and operable to convey the rotary movement of said first rotary tubular means to said second rotatable tubular means for rotating the latter in an axis other than said first axis, and an eccentric portion provided with said first rotatable tubular means for imparting oscillatory movement to the goods upon entry thereof, sequentially, initially into said first tubular means, then into said intermediate flexible hollow body means, and finally into said second rotatable means internally smooth for conveyance of the goods.

2. A rotary tubular conveyor according to claim 1, in which said intermediate flexible rotary tubular means is corrugated and reinforced by wire means.

3. A rotary tubular conveyor according to claim 1, which includes hopper means, having an outlet from which the goods are pourable, and in which said first rotatable tubular means is arranged substantially vertically below said outlet, said second rotatable tubular means being arranged at an angle with regard to the horizontal plane and said eccentric portion is radially spaced from said outlet of said hopper means.

4. A rotary tubular conveyor according to claim 3, in which between the outer surface of said hopper outlet and the inner surface of said first rotatable tubular means immediately adjacent to said eccentric portion there is provided an annular clearance gap.

5. A rotary tubular conveyor according to claim 1, which includes means for selectively adjusting said second rotatable tubular means along a vertical as well as a horizontal plane.

6. A rotary tubular conveyor according to claim 1, in which both said first and said second rotatable tubular means are tiltable relative to each other in a vertical as well as a horizontal plane.

7. A rotary tubular conveyor according to claim 1, in which said intermediate flexible hollow body means includes an outer flexible hollow body and an inner flexible hollow body, said outer flexible hollow body being operable to convey rotative movements from said first rotatable tubular means to said second rotatable tubular means, and said inner flexible hollow body serving as goods conveying means only.

References Cited

UNITED STATES PATENTS 3,071,295  1/1963  Heller _____ 222—410 X
3,351,181  11/1967  Allen et al. _____ 198—215

EDWARD A. SROKA, Primary Examiner

U.S. Cl. X.R.

198—62; 214—17